United States Patent
Wood

(10) Patent No.: US 9,463,870 B2
(45) Date of Patent: Oct. 11, 2016

(54) AERODYNAMIC STRUCTURE WITH SERIES OF SHOCK BUMPS

(75) Inventor: Norman Wood, Bristol (GB)

(73) Assignee: Airbus Operations Limited, Bristol (GB)

( * ) Notice: Subject to any disclaimer, the term of this patent is extended or adjusted under 35 U.S.C. 154(b) by 409 days.

(21) Appl. No.: 12/735,535

(22) PCT Filed: Feb. 17, 2009

(86) PCT No.: PCT/GB2009/050150
§ 371 (c)(1),
(2), (4) Date: Jul. 26, 2010

(87) PCT Pub. No.: WO2009/106869
PCT Pub. Date: Sep. 3, 2009

(65) Prior Publication Data
US 2010/0301172 A1     Dec. 2, 2010

(30) Foreign Application Priority Data
Feb. 29, 2008 (GB) .................................. 0803727.7

(51) Int. Cl.
*B64C 23/04* (2006.01)
*B64C 3/14* (2006.01)

(52) U.S. Cl.
CPC .......... *B64C 23/04* (2013.01); *B64C 2003/148* (2013.01); *B64C 2003/149* (2013.01); *Y02T 50/12* (2013.01)

(58) Field of Classification Search
CPC ............ B64C 23/04; B64C 2003/148; B64C 2003/149
USPC .................... 244/200, 200.1, 198, 130, 35 A
See application file for complete search history.

(56) References Cited

U.S. PATENT DOCUMENTS 2,532,753 A * 12/1950 Beman .......................... 244/198
2,800,291 A * 7/1957 Stephens ....................... 244/200
2,898,059 A * 8/1959 Whitcomb .................... 244/130
(Continued)

FOREIGN PATENT DOCUMENTS

GB     1 281 899      7/1972
GB     2 296 696      7/1996
(Continued)

OTHER PUBLICATIONS

International Search Report for PCT/GB2009/050150, mailed Aug. 20, 2009.
(Continued)

*Primary Examiner* — Tien Dinh
*Assistant Examiner* — Steven Hawk
(74) *Attorney, Agent, or Firm* — Nixon & Vanderhye P.C.

(57) ABSTRACT

An aerodynamic structure (1) comprising a series of shock bumps (3a, 3b, 3c) extending from its surface. The shock bumps are distributed along a line (7) with a smaller mean angle of sweep than an unperturbed shock (4) which would form adjacent to the surface during transonic movement of the structure in the absence of the shock bumps. Instead of being distributed along the line of the unperturbed shock, the shock bumps are distributed along a line which is less swept than the mean angle of sweep of the unperturbed shock. When the structure is moved at a transonic speed; a shock forms adjacent to its surface and the shock bumps perturb the shock (9) so as to reduce its angle of sweep.

9 Claims, 4 Drawing Sheets

(56) References Cited

U.S. PATENT DOCUMENTS

| | | | |
|---|---|---|---|
| 3,129,908 A | | 4/1964 | Harper |
| 3,578,264 A | * | 5/1971 | Kuethe .................... 244/200.1 |
| 4,067,518 A | | 1/1978 | Paterson et al. |
| 4,354,648 A | * | 10/1982 | Schenk et al. ............. 244/200.1 |
| 4,643,376 A | * | 2/1987 | Vanderhoeven ............. 244/198 |
| 5,058,837 A | * | 10/1991 | Wheeler .................... 244/200.1 |
| 5,433,404 A | * | 7/1995 | Ashill et al. .................. 244/200 |
| 5,692,709 A | * | 12/1997 | Mihora et al. ................. 244/204 |
| 6,929,214 B2 | * | 8/2005 | Ackleson et al. ............. 244/1 R |
| 7,118,071 B2 | * | 10/2006 | Bogue ........................... 244/130 |
| 7,784,737 B2 | * | 8/2010 | Lee et al. ...................... 244/130 |
| 8,016,245 B2 | | 9/2011 | Hassan et al. |
| 2006/0021560 A1 | * | 2/2006 | McMillan et al. ............ 244/130 |
| 2006/0060720 A1 | | 3/2006 | Bogue |
| 2007/0018055 A1 | | 1/2007 | Schmidt |
| 2009/0084906 A1 | | 4/2009 | Hassan et al. |
| 2009/0294596 A1 | | 12/2009 | Sinha et al. |

FOREIGN PATENT DOCUMENTS

| | | |
|---|---|---|
| JP | 4-138994 | 5/1992 |
| WO | WO 00/01578 | 1/2000 |
| WO | WO 2005/032938 | 4/2005 |

OTHER PUBLICATIONS

Written Opinion of the International Searching Authority for PCT/GB2009/050150, mailed Aug. 20, 2009.
UK Search Report for GB 0803727.7, dated Apr. 27, 2008.
Birkmeyer et al., "Shock control on a swept wing", Aerospace Science and Technology, vol. 4, No. 3, (Jan. 1, 2000), pp. 147-156.
Ogawa et al., "Shock/Boundary-Layer Interaction Control Using Three-Dimensional Bumps for Transonic Wings", Collection of Technical Papers, vol. AIAA 2007-324, (Jan. 8, 2007), pp. 1-23.
Dargel, G. et al., "21 Assessment of Shock and Boundary Layer Control Concepts for Hybrid Laminar Flow Wing Design", Drag Reduction by Shock and Boundary Layer Control. Results of the Project Euroshock II, Supported by the EP Union 1996-1999, vol. 80, (Jan. 1, 2002), pp. 383-414.
Holden, et al., "Shock/Boundary Layer Interaction Control Using 3D Devices", 41st AIAA Aerospace Sciences Meeting and Exhibit, vol. 41st, No. Paper 2003-0447, (Jan. 6, 2003), pp. 1-8.
Milholen, W.E. II et al., "On the Application of Contour Bumps for Transonic Drag Reduction (Invited)", American Institute of Aeronautics and Astronautics 2005-0462, pp. 1-19.
U.S. Appl. No. 12/735,540, filed Jul. 26, 2010, Wood.
U.S. Appl. No. 12/735,541, filed Jul. 26, 2010, Wood.
U.S. Appl. No. 12/735,536, filed Jul. 26, 2010, Wood.
U.S. Appl. No. 12/735,534, filed Jul. 26, 2010, Wood.
International Search Report and Written Opinion of the International Searching Authority for PCT/GB2009/050152, mailed Aug. 20, 2009.
UK Search Report for GB 0803724.4, dated Apr. 27, 2008.
International Search Report and Written Opinion of the International Searching Authority for PCT/GB2009/050153, mailed Aug. 20, 2009.
UK Search Report for GB 0803719.4, dated Apr. 27, 2008.
International Search Report and Written Opinion of the International Searching Authority for PCT/GB2009/050154, mailed Aug. 20, 2009.
UK Search Report for GB 0803730.1, dated Jun. 23, 2008.
International Search Report and Written Opinion of the International Searching Authority for PCT/GB2009/050151, mailed Aug. 20, 2009.
UK Search Report for GB 0803722.8, dated Apr. 27, 2008.
Office Action mailed Dec. 22, 2011 in co-pending U.S. Appl. No. 12/735,540.
Office Action mailed Dec. 23, 2011 in co-pending U.S. Appl. No. 12/735,541.
Office Action mailed Dec. 23, 2011 in co-pending U.S. Appl. No. 12/735,536.
Office Action mailed Dec. 22, 2011 in co-pending U.S. Appl. No. 12/735,534.
Office Action mailed Jun. 29, 2012 in co-pending U.S. Appl. No. 12/735,540.
Office Action mailed Jun. 22, 2012 in co-pending U.S. Appl. No. 12/735,541.
Office Action mailed Jul. 3, 2012 in co-pending U.S. Appl. No. 12/735,536.
Office Action mailed Jun. 29, 2012 in co-pending U.S. Appl. No. 12/735,534.
Russian Office Action dated Jan. 21, 2013 in RU 2010139003/11(055759) and English translation.

* cited by examiner

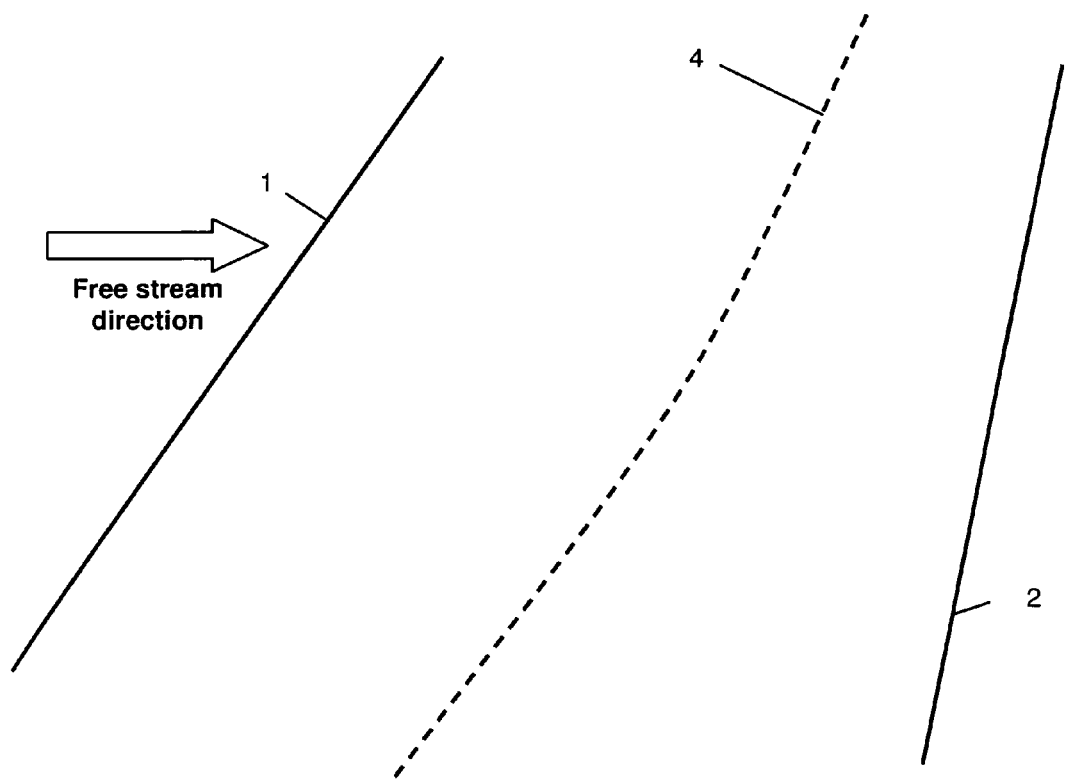

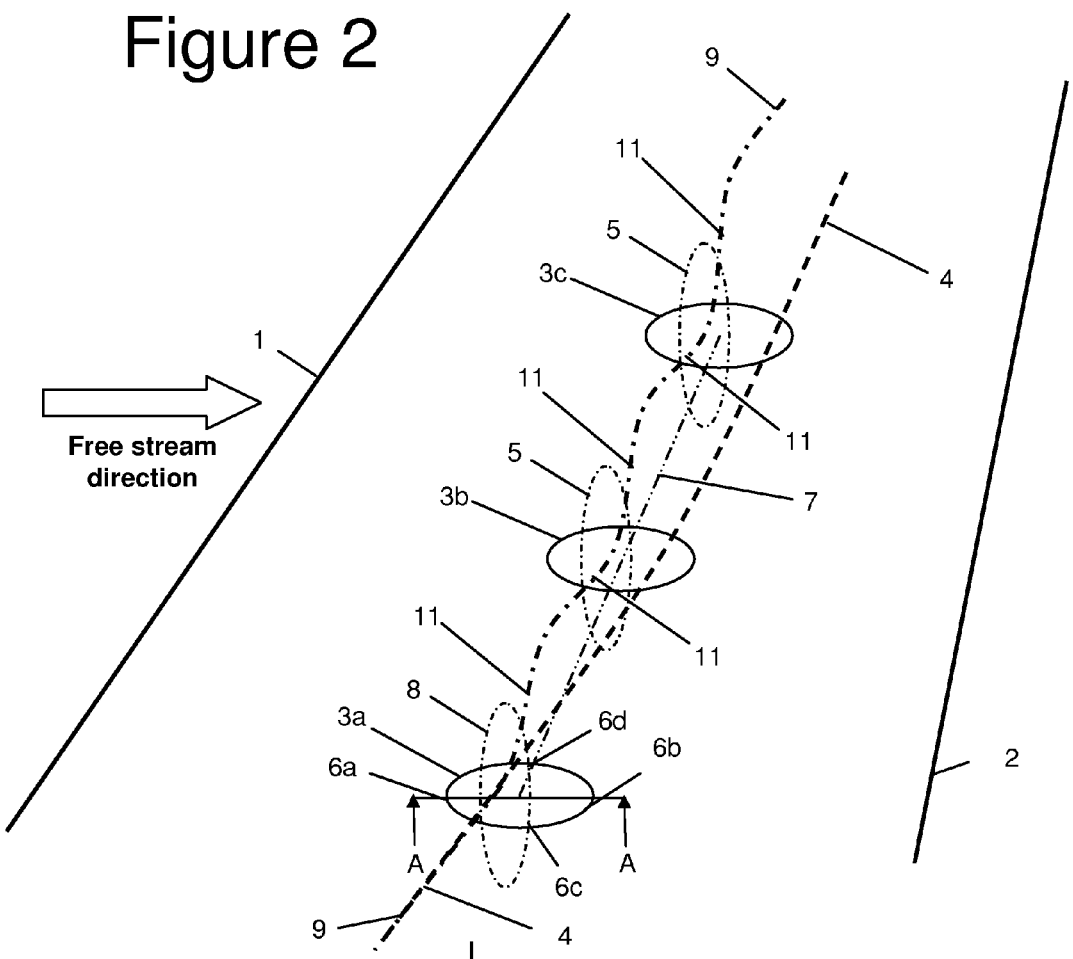
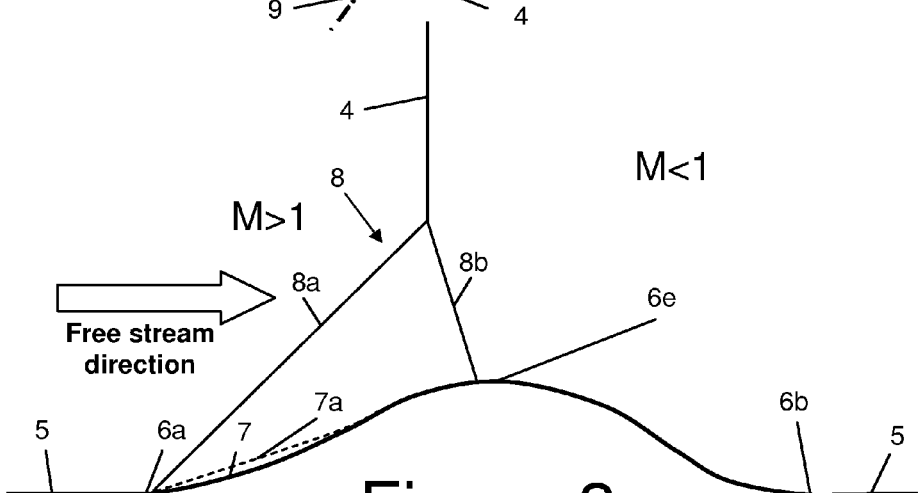

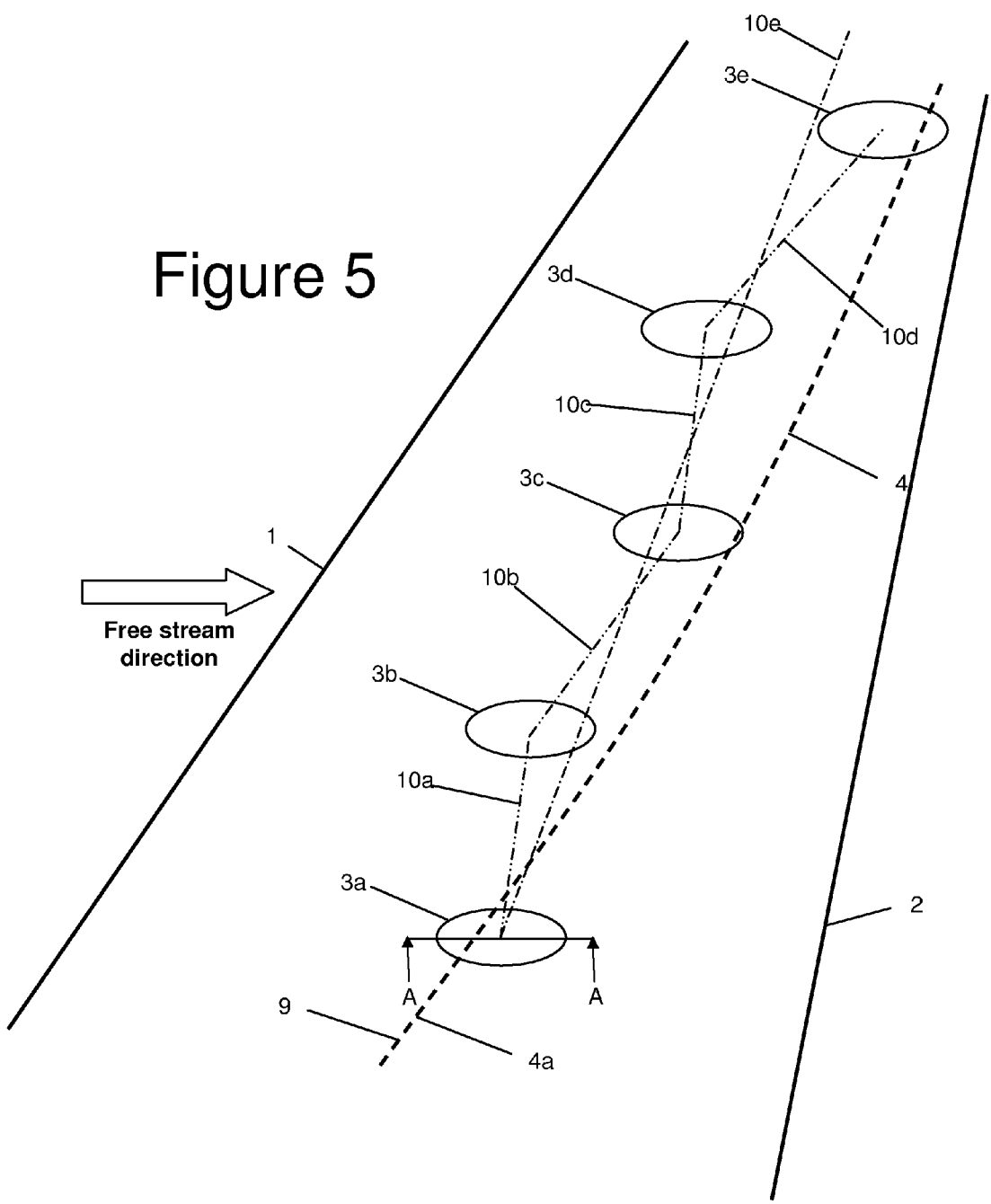

AERODYNAMIC STRUCTURE WITH SERIES OF SHOCK BUMPS

This application is the U.S. national phase of International Application No. PCT/GB2009/050150 filed 17 Feb. 2009, which designated the U.S. and claims priority to GB Application No. 0803727.7 filed 29 Feb. 2008, the entire contents of each of which are hereby incorporated by reference.

FIELD OF THE INVENTION

The present invention relates to an aerodynamic structure comprising a series of shock bumps extending from its surface, and a method of operating such a structure.

BACKGROUND OF THE INVENTION

FIG. 1 is a plan view of the upper surface of an aircraft wing. The wing has a leading edge 1 and a trailing edge 2, each swept to the rear relative to the free stream direction. At transonic speeds a swept shock 4 forms normal to the upper surface of the wing. As described in Holden, H. A. and Babinsky, H. (2003) *Shock/boundary layer interaction control using 3D devices* In: 41st Aerospace Sciences Meeting and Exhibit, Jan. 6-9, 2003, Reno, Nev., USA, Paper no. AIAA 2003-447, a 3-D shock bump can be used to induce a smeared shock foot with a lambda-like wave pattern.

Conventionally the chord-wise position of such bumps is dictated by the expected position of the shock 4. However for either laminar or turbulent wings the position is a complex function of Mach number and lift coefficient. The wave drag associated with a shock can be alleviated by the use of a 3-D shock bump that will exhibit maximum benefit when the shock is at a particular location on the bump. Hence as the flight conditions vary the shock may move away from this optimal location.

A traditional approach to solve this problem is to deploy trailing edge variable camber to modify the aerofoil shape and hence the shock location and this incurs additional weight and systems complexity. The challenge then is to find a way of fixing the shock wave independent of the shape of the wing section and the span load distribution.

US 2006/0060720 uses a shock control protrusion to generate a shock extending away from the lower surface of a wing.

SUMMARY OF THE INVENTION

A first aspect of the invention provides an aerodynamic structure comprising a series of shock bumps extending from its surface, the shock bumps being distributed along a line with a smaller mean angle of sweep than an unperturbed shock which would form adjacent to the surface during transonic movement of the structure in the absence of the shock bumps.

Instead of being distributed along the line of the unperturbed shock, the shock bumps are distributed along a line which is less swept than the mean angle of sweep of the unperturbed shock. That is, if the unperturbed shock is swept to the rear then the line is either not swept or is swept to the rear by a smaller angle of sweep. Equivalently, if the unperturbed shock is swept forward then the line is either not swept or is swept forward by a smaller angle of sweep. In other words, the shock bumps "un-sweep" the shock.

A second aspect of the invention provides a method of operating an aerodynamic structure comprising a series of shock bumps extending from its surface, the method comprising: moving the structure at a transonic speed; forming a shock adjacent to its surface; and perturbing the shock with the series of shock bumps so as to reduce its angle of sweep.

Typically the shock bumps cause the shock to form a stepped plan-form shape with a series of points of inflection.

Typically each shock bump induces a smeared shock foot with a lambda-like wave pattern.

Typically a first shock bump in the series is positioned in line with the position of the unperturbed shock, and the other shock bumps in the series are positioned either fore or aft of the position of the unperturbed shock (depending on whether the unperturbed shock is swept back or forward respectively).

Typically each bump has a leading edge, a trailing edge, an inboard edge and an outboard edge. The bumps may merge gradually into the surface at its edges or there may be an abrupt concave discontinuity at one or more of its edges.

Typically each bump has substantially no sharp convex edges or points.

Typically the shock bumps are shaped and positioned so as to modify the structure of the unperturbed shock. This can be contrasted with US 2006/0060720 which uses a shock control protrusion to generate a shock which would not otherwise exist in the absence of the shock control protrusion.

The structure may comprise an aerofoil such as an aircraft wing, horizontal tail plane or control surface; an aircraft structure such as a nacelle, pylon or fin; or any other kind of aerodynamic structure such as a turbine blade.

In the case of an aerofoil the shock bumps may be located on a high pressure surface of the aerofoil (that is, the lower surface in the case of an aircraft wing) but more preferably the surface is a low pressure surface of the aerofoil (that is, the upper surface in the case of an aircraft wing). Also each bump typically has an apex which is positioned towards the trailing edge of the aerofoil, in other words it is positioned aft of 50% chord. The apex of the bump may be a single point, or a plateau. In the case of a flat plateau then the leading edge of the plateau is positioned towards the trailing edge of the aerofoil.

BRIEF DESCRIPTION OF THE DRAWINGS

Embodiments of the invention will now be described with reference to the accompanying drawings, in which:

FIG. 1 is a plan view of the top of an aircraft wing;

FIG. 2 is a plan view of the top of an aircraft wing carrying a series of shock bumps according to a first embodiment of the invention;

FIG. 3 is a cross-sectional view through the centre of one of the bumps taken along a line A-A;

FIG. 5 is a plan view of the top of an aircraft wing carrying a series of shock bumps according to a second embodiment of the invention.

DETAILED DESCRIPTION OF EMBODIMENT(S)

Figure 4:
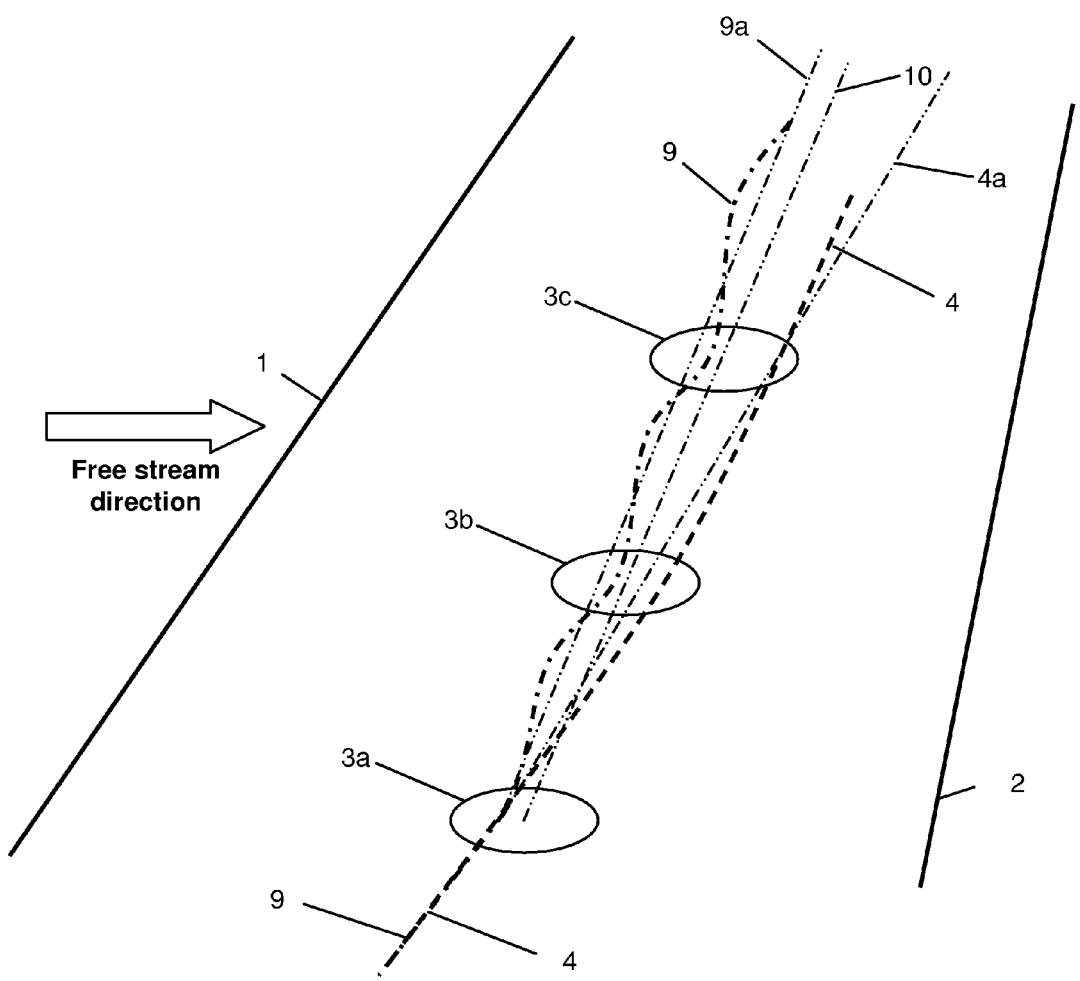
FIG. 4 is a plan view showing the mean sweep angles of the perturbed and unperturbed shocks, outboard of the first shock bump.

FIG. 2 is a plan view of the upper surface of an aircraft wing in a transonic flow similar to the wing of FIG. 1. The footprint of a series of shock bumps is indicated at 3a-3c and FIG. 3 is a longitudinal cross-sectional view through the centre of one of the bumps taken along a line A-A which is parallel with the free stream direction. An unperturbed shock 4 would form adjacent to the surface of the wing during transonic cruise flight conditions in the absence of the shock bumps.

Each bump protrudes from a nominal surface 5 of the wing, and meets the nominal surface 5 at a leading edge 6a; a trailing edge 6b; an inboard edge 6c; and an outboard edge 6d. Each bump also has an apex point 6e. The lower portions of the sides of bump are concave and merge gradually into the nominal surface 5. For example in FIG. 3 the lower portion 7 of the front side of the bump merges gradually into the nominal surface 5 at leading edge 6a. Alternatively there may be an abrupt discontinuity at one or more of the edges of the bump. For instance the lower portion of the front side of the bump may be planar as illustrated in dashed lines at 7a. In this case the front side 7a of the shock bump meets the nominal surface 5 with an abrupt discontinuity at the leading edge 6a. The apex point 6e of the fore/aft cross-section A-A is offset aft of the centre of the bump. The apex 6e of each bump 3a-3c is also positioned aft of 50% chord, typically between 60% and 65% chord. Note that, unlike vortex generators, the bumps have no sharp convex edges or points so the flow remains attached over the bumps when they are operated at their optimum (i.e. when the shock is positioned on the bump just ahead of its apex).

The shock bumps 3a-3c modify the structure of the shock by inducing a smeared shock foot 8 with a lambda like wave pattern shown in FIG. 3. When the shock bumps 3a-3c are operated at their optimum with the shock 4 just ahead of the apex 6e of the bump as shown in FIG. 3, the smeared foot 8 has a lambda-like wave pattern with a single forward shock 8a towards the leading edge of the bump and a single rear shock 8b positioned slightly forward of the apex 6e. Alternatively, instead of having only a single forward shock 8a, the smeared foot may have a lambda-like wave pattern with a fan-like series of forward shocks. As the local flow is generally just above the sonic condition the perturbation to the flow spreads sideways almost normal to the free stream direction and not along the unperturbed shock 4. This is illustrated in FIG. 2 by a perturbed shock line 9 which is coincident with the unperturbed shock 4 until it reaches the first (most inboard) shock bump 3a. At this point the shock bump perturbs the shock so that the perturbed shock line 9 bends forwards as shown. At some span-wise distance from the first bump 3a the flow returns to its unperturbed state and attempts to return to its original chord-wise location. This results in a point of inflection 11 in the perturbed shock line 9. The second bump 3b is placed outboard of the bump 3a and forward of the line 4 to re-perturb the shock knowing that, independent of the original shock location 4, the first bump 3a will be dictating the path of the smeared lambda shock. Similarly the third bump 3b is placed at a suitable position outboard of the bump 3b and forward of the line 4 to re-perturb the shock. More than three shock bumps may be used to extend the process towards the wing tip.

The shock bumps 3a-3c cause the shock to form a stepped plan-form shape 9 with a series of points of inflection 11. FIG. 4 is a plan view showing a line 9a representing the mean sweep angle of the perturbed shock 9 and a line 4a representing the mean sweep angle of the unperturbed shock 4 outboard of the first shock bump 3a. As shown in FIG. 4, the line 9a is less swept than the line 4a.

The perturbed location 9 of the shock is determined as a function of the flow of the innermost bump 3a and not the lift coefficient or Mach number. This precludes the need for a variable camber system and maintains the bumps operating at or near their optimum for a variety of flight conditions.

The centres of the shock bumps are distributed along a line 10. This line 10 is also less swept than the line 4a. In the example shown in FIG. 2, all of the shock bumps 3a-3c are centred on a straight line 10. However in other embodiments the centres of the bumps may not all lie on a straight line, an example being given in FIG. 5. In this example the shock bumps 3a-3e are distributed along a zigzag line 10a-10d. The mean sweep angle (indicated by line 10e) of the zigzag line 10a-10d is swept to a lesser degree than the mean sweep angle of the unperturbed shock 4 outboard of the first bump 10a, in a similar manner to the line 10 in FIG. 2. Note that the deviation of the zigzag line 10a-10d from the straight mean line 10e is exaggerated in FIG. 5 for purposes of illustration.

Although the shock bumps are shown on an upper surface of a wing, similar arrangements could be used in a variety of other applications e.g. around pylons and nacelles. They may also provide a reduction in profile power and noise when applied to the tips of helicopter rotors and propeller blades.

Although the invention has been described above with reference to one or more preferred embodiments, it will be appreciated that various changes or modifications may be made without departing from the scope of the invention as defined in the appended claims.

The invention claimed is:

1. A method of operating an aerodynamic structure comprising a leading edge, a trailing edge and series of 3-D shock bumps extending from a surface of said structure, wherein the aerodynamic structure has a fifty percent chord line half way between the leading edge and the trailing edge, the fifty percent chord line has a first angle of sweep, each of the 3-D shock bumps have an apex positioned towards the trailing edge and aft of the fifty percent chord line, and the 3-D shock bumps are distributed along a line with a mean angle of sweep which is less than the first angle of sweep of the fifty percent chord line, wherein the method comprises:
   flying the aerodynamic structure at a speed sufficient to form a shock on the wing, and
   perturbing the shock at the surface with the series of 3-D shock bumps.

2. The method according to claim 1 wherein the 3-D shock bumps are aligned along the line and the perturbation of the shock is performed by the 3-D shock bumps aligned along the line.

3. The method according to claim 1 further comprising inducing with each of the 3-D shock bumps a smeared shock foot with a lambda wave pattern.

4. The method according to claim 1 wherein airflow over at least one of the 3-D shock bumps is attached during the perturbation of the shock.

5. The method of claim 1 wherein the 3-D shock bumps each correspond to a different one of points of inflection of the perturbed shock.

6. A method of perturbing a shock on an aerodynamic wing, the wing comprising a leading edge, a trailing edge and a series of three dimensional shock bumps extending from a surface of the wing, wherein the wing has a fifty percent chord line half way between the leading edge and the trailing edge, the fifty percent chord line has a first angle of sweep, each of the three dimensional shock bumps have an apex positioned between the trailing edge and the fifty percent chord line, and the three dimensional shock bumps are distributed along a line with a mean angle of sweep which is less than the first angle of sweep of the fifty percent chord line, the method comprising:

flying the wing at a speed sufficient to form a shock on the wing, and perturbing the shock by the three dimensional shock bumps.

7. The method of claim 6 wherein the three dimensional shock bumps each correspond to a different one of points of inflections formed in the shock during the perturbation.

8. A method to perturb an aerodynamic shock attached to an aerodynamic wing, wherein the wing has a leading edge, a trailing edge, an outer surface extending between the leading edge and the trailing edge and three dimensional shock bumps extending from the outer surface of the wing, wherein the wing has a fifty percent chord line half way between the leading edge and the trailing edge, the fifty percent chord line has a first angle of sweep, each of the three dimensional shock bumps have an apex between the trailing edge and the fifty percent chord line, and the three dimensional shock bumps are aligned with a line having a mean angle of sweep less than the first angle of sweep, the method comprising:

flying the wing to form the aerodynamic shock attached to the wing, and perturbing the shock by the three dimensional shock bumps, wherein the shock bumps cause the aerodynamic shock to have a stepped plan-form shape with points of inflection.

9. The method of claim 8 wherein the three dimensional shock bumps each correspond to a different one of the points of inflections in the shock during the perturbation.

\* \* \* \* \*